(12) United States Patent
Hillesund

(10) Patent No.: US 11,079,506 B2
(45) Date of Patent: Aug. 3, 2021

(54) MULTICOMPONENT STREAMER

(71) Applicant: PGS Geophysical AS, Oslo (NO)

(72) Inventor: Øyvind Hillesund, Oslo (NO)

(73) Assignee: PGS Geophysical AS, Oslo (NO)

( * ) Notice: Subject to any disclaimer, the term of this patent is extended or adjusted under 35 U.S.C. 154(b) by 405 days.

(21) Appl. No.: 15/830,103

(22) Filed: Dec. 4, 2017

(65) Prior Publication Data

US 2018/0172856 A1 Jun. 21, 2018

Related U.S. Application Data

(60) Provisional application No. 62/435,190, filed on Dec. 16, 2016.

(51) Int. Cl.
*G01V 1/38* (2006.01)
*G01V 1/20* (2006.01)
(Continued)

(52) U.S. Cl.
CPC ............ *G01V 1/201* (2013.01); *G01V 1/3817* (2013.01); *G01V 1/3826* (2013.01); *G01V 1/184* (2013.01);
(Continued)

(58) Field of Classification Search
CPC .... G01V 1/201; G01V 1/3817; G01V 1/3826; G01V 1/184; G01V 1/186; G01V 1/202;
(Continued)

(56) References Cited

U.S. PATENT DOCUMENTS 3,299,397 A * 1/1967 Pavey, Jr. .............. G01V 1/201
367/24
3,659,256 A 4/1972 Hudson et al.
(Continued)

FOREIGN PATENT DOCUMENTS

AU 4066197 3/1998
CN 102778694 11/2012
(Continued)

OTHER PUBLICATIONS

Paulson et al., "A MEMS Accelerometer for Multicomponent Streamers," We P6 06, 77th EAGE Conference & Exhibition, Jun. 1-4, 2015, 5 pages.
(Continued)

*Primary Examiner* — Krystine E Breier

(57) ABSTRACT

A seismic streamer includes an outer sheath that forms an interior region of the seismic streamer of which a portion is filled with a gel or liquid. The streamer also includes at least one stress member placed off-center in the interior region, and multiple sensors mounted proximate to a center of the interior region, where the sensors include a pressure sensor and a motion sensor. The streamer further includes multiple tilt sensors mounted along the interior region. A method of manufacturing a seismic streamer includes placing at least one stress member off-center along a first direction, mounting multiple spacers along the stress member, and affixing sensors to respective spacers, where the sensors include a pressure sensor and a motion sensor. The method further includes mounting tilt sensors along the first direction and affixing an outer sheath to the streamer that forms an interior region of the seismic streamer.

20 Claims, 4 Drawing Sheets

(51) Int. Cl.
*G01V 1/18* (2006.01)
*G01V 1/22* (2006.01)

(52) U.S. Cl.
CPC .............. *G01V 1/186* (2013.01); *G01V 1/202* (2013.01); *G01V 1/22* (2013.01); *G01V 2001/204* (2013.01); *G01V 2001/207* (2013.01)

(58) Field of Classification Search
CPC .............. G01V 1/22; G01V 2001/204; G01V 2001/207
See application file for complete search history.

(56) References Cited

U.S. PATENT DOCUMENTS

| | | |
|---|---|---|
| 3,660,809 A | 5/1972 | Pearson |
| 3,930,254 A | 12/1975 | Pavey, Jr. |
| 4,163,206 A | 7/1979 | Hall, Jr. |
| 4,477,887 A | 10/1984 | Berni |
| 4,737,937 A | 4/1988 | Keckler et al. |
| 4,942,557 A | 7/1990 | Seriff |
| 5,058,080 A | 10/1991 | Siems et al. |
| 5,130,953 A | 7/1992 | Grosso |
| 5,136,549 A | 8/1992 | Berglund |
| 5,155,708 A | 10/1992 | Bedi et al. |
| 5,189,332 A | 2/1993 | Wild |
| 5,251,182 A | 10/1993 | Carpenter |
| 5,268,879 A | 12/1993 | Flanagan |
| 5,274,603 A | 12/1993 | Zibilich, Jr. et al. |
| 5,303,202 A | 4/1994 | Carroll et al. |
| 5,367,499 A | 11/1994 | Morningstar et al. |
| 5,412,621 A | 5/1995 | Hepp |
| 5,463,193 A | 10/1995 | Carpenter et al. |
| 5,499,219 A | 3/1996 | Brenner et al. |
| 5,508,976 A | 4/1996 | Pauer |
| 5,561,640 A | 10/1996 | Maciejewski |
| 5,670,932 A | 9/1997 | Kizima |
| 5,675,556 A | 10/1997 | Erath et al. |
| 5,742,562 A | 4/1998 | Marschall et al. |
| 5,883,856 A | 3/1999 | Carroll et al. |
| 5,883,857 A | 3/1999 | Pearce |
| 5,943,293 A | 8/1999 | Luscombe et al. |
| 6,009,042 A | 12/1999 | Workman et al. |
| 6,108,267 A | 8/2000 | Pearce |
| 6,108,274 A | 8/2000 | Pearce |
| 6,111,819 A | 8/2000 | Deus, III et al. |
| 6,111,820 A | 8/2000 | Ames |
| 6,118,733 A | 9/2000 | Ames |
| 6,122,225 A | 9/2000 | Cheng et al. |
| 6,262,944 B1 | 7/2001 | Meyer et al. |
| 6,337,636 B1 | 1/2002 | Page et al. |
| 6,477,111 B1 | 11/2002 | Lunde et al. |
| 6,512,980 B1 | 1/2003 | Barr |
| 6,580,661 B1 | 6/2003 | Marschall et al. |
| 6,612,886 B2 | 9/2003 | Cole, Jr. |
| 6,614,723 B2 | 9/2003 | Pearce et al. |
| 6,617,765 B1 | 9/2003 | Lagier et al. |
| 6,657,365 B1 | 12/2003 | Ambs |
| 6,691,038 B2 | 2/2004 | Zajac |
| 6,771,006 B2 | 8/2004 | Zioter et al. |
| 6,816,082 B1 | 11/2004 | Laborde |
| 6,825,594 B1 | 11/2004 | Thurn |
| 6,839,302 B2 | 1/2005 | Austad et al. |
| 6,879,546 B2 * | 4/2005 | Halvorsen .............. G01V 1/201 367/166 |
| 6,894,948 B2 | 5/2005 | Brittan et al. |
| 6,992,951 B2 | 1/2006 | O'Brien et al. |
| 7,105,986 B2 | 9/2006 | Wildes et al. |
| 7,116,850 B2 | 10/2006 | Woo |
| 7,120,087 B2 | 10/2006 | Lee et al. |
| 7,149,149 B2 | 12/2006 | Sullivan |
| 7,167,413 B1 | 1/2007 | Rouquette |
| 7,221,077 B2 | 5/2007 | Sawada |
| 7,239,577 B2 | 7/2007 | Tenghamn et al. |
| 7,298,672 B1 | 11/2007 | Tenghamn et al. |
| 7,359,283 B2 | 4/2008 | Vaage et al. |
| 7,366,055 B2 | 4/2008 | Ronnekleiv et al. |
| 7,382,689 B2 | 6/2008 | Maples et al. |
| 7,446,535 B1 | 11/2008 | Tenghamn et al. |
| 7,460,434 B2 | 12/2008 | Stenzel et al. |
| 7,466,625 B2 | 12/2008 | Robertsson et al. |
| 7,483,335 B2 | 1/2009 | Oldervoll et al. |
| 7,545,703 B2 | 6/2009 | Lunde et al. |
| 7,548,486 B2 | 6/2009 | Tenghamn |
| 7,583,563 B2 | 9/2009 | Nakajima |
| 7,612,486 B2 | 11/2009 | Yuuya et al. |
| 7,616,523 B1 | 11/2009 | Tabti et al. |
| 7,622,706 B2 | 11/2009 | Maas |
| 7,623,414 B2 | 11/2009 | Boergen et al. |
| 7,671,598 B2 | 3/2010 | Ronaess et al. |
| 7,693,005 B2 | 4/2010 | Stenzel et al. |
| 7,701,118 B2 | 4/2010 | Molenaar et al. |
| 7,733,740 B2 | 6/2010 | Hillesund et al. |
| 7,737,609 B2 | 6/2010 | Murata et al. |
| 7,855,934 B2 | 12/2010 | Kitchin et al. |
| 7,881,159 B2 | 2/2011 | Hegna et al. |
| 7,926,614 B2 | 4/2011 | Tenghamn et al. |
| 7,948,827 B2 | 5/2011 | Chamberlain |
| 8,094,519 B2 | 1/2012 | Lagakos et al. |
| 8,115,651 B2 | 2/2012 | Camwell et al. |
| 8,182,175 B2 | 5/2012 | Iffergan |
| 8,319,497 B2 | 11/2012 | Sudow et al. |
| 8,358,560 B2 | 1/2013 | Muyzert et al. |
| 8,469,634 B2 | 6/2013 | Stenzel et al. |
| 8,514,656 B2 | 8/2013 | Juhasz et al. |
| 8,515,101 B2 | 8/2013 | Shiba |
| 8,520,469 B2 | 8/2013 | Ronnow et al. |
| 8,547,787 B2 | 10/2013 | Ozdemir et al. |
| 8,553,490 B2 | 10/2013 | Hillesund et al. |
| 8,588,026 B2 | 11/2013 | Traetten et al. |
| 8,596,139 B2 | 12/2013 | Mueller et al. |
| 8,644,109 B2 | 2/2014 | Vignaux |
| 8,665,671 B2 | 3/2014 | Muyzert et al. |
| 8,695,431 B2 | 4/2014 | Pearce |
| 8,737,172 B2 | 5/2014 | Kurpiewski |
| 8,754,649 B2 | 6/2014 | Sudow et al. |
| 8,902,700 B2 | 12/2014 | Muyzert et al. |
| 8,982,662 B2 | 3/2015 | Rouquette et al. |
| 8,995,221 B2 | 3/2015 | Stenzel |
| 8,998,535 B2 | 4/2015 | Stenzel et al. |
| 9,019,797 B2 | 4/2015 | Goujon |
| 9,038,765 B2 | 5/2015 | Goujon et al. |
| 9,097,817 B2 | 8/2015 | Teigen |
| 9,105,835 B2 | 8/2015 | Ibata et al. |
| 9,110,187 B2 | 8/2015 | Muyzert et al. |
| 9,176,254 B2 | 11/2015 | Johnstad |
| 9,207,340 B2 | 12/2015 | Stenzel et al. |
| 9,213,114 B2 | 12/2015 | Bacanek et al. |
| 9,217,800 B2 | 12/2015 | Pearce et al. |
| 9,217,805 B2 | 12/2015 | Welker et al. |
| 9,291,731 B2 | 3/2016 | Perciot et al. |
| 9,470,806 B2 | 10/2016 | Fernihough |
| 9,733,370 B2 * | 8/2017 | Maples .................. G01V 1/184 |
| 9,874,647 B2 * | 1/2018 | Sudow .................. G01V 1/201 |
| 2004/0105533 A1 | 6/2004 | Iseli |
| 2005/0270902 A1 | 12/2005 | Tonnessen |
| 2006/0013065 A1 | 1/2006 | Varsamis et al. |
| 2006/0126432 A1 | 6/2006 | Hoogeveen |
| 2006/0193203 A1 | 8/2006 | Tenghamn et al. |
| 2007/0064528 A1 | 3/2007 | Metzbower et al. |
| 2007/0258320 A1 | 11/2007 | Harrick et al. |
| 2008/0049551 A1 | 2/2008 | Muyzert et al. |
| 2008/0186803 A1 | 8/2008 | McKey et al. |
| 2008/0253226 A1 | 10/2008 | Tenghamn et al. |
| 2008/0310298 A1 | 12/2008 | Drange |
| 2009/0010101 A1 | 1/2009 | Lunde et al. |
| 2009/0296521 A1 | 12/2009 | Perciot et al. |
| 2010/0039889 A1 | 2/2010 | Teigen et al. |
| 2010/0172205 A1 | 7/2010 | Hillesund et al. |
| 2010/0202251 A1 | 8/2010 | Ozdemir et al. |
| 2011/0007602 A1 | 1/2011 | Welker et al. |
| 2011/0051551 A1 | 3/2011 | Tenghamn |
| 2011/0273957 A1 * | 11/2011 | Guizelin .............. G01V 1/201 367/20 |

(56) References Cited

U.S. PATENT DOCUMENTS

| | | |
|---|---|---|
| 2011/0292759 A1 | 12/2011 | Sudow et al. |
| 2011/0310698 A1 | 12/2011 | Maples et al. |
| 2011/0320147 A1 | 12/2011 | Brady et al. |
| 2012/0069706 A1 | 3/2012 | Goujon et al. |
| 2012/0081994 A1 | 4/2012 | Husom et al. |
| 2012/0163120 A1 | 6/2012 | Pearce |
| 2012/0170407 A1 | 7/2012 | Crice |
| 2012/0176859 A1 | 7/2012 | Pabon et al. |
| 2012/0250457 A1 | 10/2012 | Rickert, Jr. et al. |
| 2013/0026885 A1 | 1/2013 | Kim et al. |
| 2013/0028047 A1 | 1/2013 | Erofeev et al. |
| 2013/0038174 A1 | 2/2013 | Kim et al. |
| 2013/0049535 A1 | 2/2013 | Kim et al. |
| 2013/0064038 A1 | 3/2013 | Maples et al. |
| 2013/0135969 A1 | 5/2013 | Crice |
| 2013/0258807 A1 | 10/2013 | Erneland |
| 2013/0285828 A1 | 10/2013 | Yoon et al. |
| 2014/0029377 A1* | 1/2014 | Mellier ............ G01V 1/00 367/13 |
| 2014/0104981 A1 | 4/2014 | Duboue et al. |
| 2014/0226438 A1 | 8/2014 | Nurre |
| 2014/0254310 A1 | 9/2014 | Voldsbekk |
| 2014/0269180 A1 | 9/2014 | Tenghamn et al. |
| 2014/0293742 A1 | 10/2014 | Pearce |
| 2014/0307524 A1 | 10/2014 | Crice et al. |
| 2014/0307526 A1 | 10/2014 | Crice et al. |
| 2014/0336939 A1 | 11/2014 | Brune |
| 2014/0355380 A1 | 12/2014 | Barral et al. |
| 2014/0362660 A1 | 12/2014 | Pearce |
| 2014/0376329 A1 | 12/2014 | Aaker et al. |
| 2015/0002158 A1 | 1/2015 | Tayart De Borms et al. |
| 2015/0020726 A1 | 1/2015 | McLemore et al. |
| 2015/0061685 A1 | 3/2015 | MacKay et al. |
| 2015/0063063 A1 | 3/2015 | Sudow et al. |
| 2015/0063065 A1 | 3/2015 | Bagaini et al. |
| 2015/0089784 A1 | 4/2015 | Maples et al. |
| 2015/0098302 A1 | 4/2015 | Olivier |
| 2015/0117146 A1 | 4/2015 | Pearce |
| 2015/0117147 A1 | 4/2015 | Hegge et al. |
| 2015/0121124 A1 | 4/2015 | Hillesund et al. |
| 2015/0124563 A1 | 5/2015 | Elder et al. |
| 2015/0198731 A1 | 7/2015 | Muijzert et al. |
| 2015/0219777 A1 | 8/2015 | Smith |
| 2015/0226554 A1 | 8/2015 | Eick et al. |
| 2015/0241497 A1 | 8/2015 | Sellin |
| 2015/0337651 A1 | 11/2015 | Prammer |
| 2015/0355362 A1 | 12/2015 | Eick et al. |
| 2015/0369627 A1 | 12/2015 | Oscarsson et al. |
| 2015/0369945 A1 | 12/2015 | Drange |
| 2016/0018545 A1* | 1/2016 | Rouquette ............ G01V 1/3817 367/24 |
| 2016/0313366 A1 | 10/2016 | Sudow et al. |
| 2018/0372895 A1* | 12/2018 | Guizelin ................ G01V 1/201 |

FOREIGN PATENT DOCUMENTS

| | | |
|---|---|---|
| EP | 0669169 | 8/1996 |
| EP | 0560558 | 12/1996 |
| EP | 1709464 | 10/2006 |
| EP | 2690468 | 1/2014 |
| EP | 2843444 | 3/2015 |
| GB | 2421078 | 4/2008 |
| KR | 100517059 | 9/2005 |
| NO | 176225 | 11/1994 |
| WO | 2005073758 | 8/2005 |
| WO | 15097435 | 7/2015 |
| WO | 2015109175 | 7/2015 |
| WO | 2015113031 | 7/2015 |
| WO | 2015170170 | 11/2015 |
| WO | 2015195939 | 12/2015 |
| WO | 2016007505 | 1/2016 |
| WO | 2016008782 | 1/2016 |
| WO | 2017/112436 A1 | 6/2017 |

OTHER PUBLICATIONS

Amundsen, et al., "Broadband Seismic Technology and Beyond Part IV: PGS's Geostreamer—Mission Impossible," GEO ExPro—Broadband Seismic Technology, vol. 10, No. 4, 2013, 9 pages.

Carlson, et al., "Increased resolution of seismic data from a dual sensor streamer cable," SEG/San Antonio 2007 Annual Meeting, pp. 994-998.

Extended European Search Report in Appl. No. 17207059.1 dated May 28, 2018, 13 pages.

Examination Report in Appl. No. 17207059.1 dated Jan. 12, 2021, 10 pages.

\* cited by examiner

MULTICOMPONENT STREAMER

CROSS-REFERENCE TO RELATED APPLICATIONS

This application claims the benefit of Provisional Patent Application No. 62/435,190 filed Dec. 16, 2016, which is hereby incorporated by reference in its entirety.

BACKGROUND

Marine seismic surveying is a technique for investigating geological features underneath a body of water using acoustic energy imparted into the body of water. The acoustic energy is reflected from boundaries with different acoustic impedances located under the body of water. Sensors within towed marine seismic streamers convert the reflected acoustic energy, which may be processed to identify potential subsurface structures that may aid in the location of hydrocarbons.

Various configurations of vessels, seismic streamers, and seismic sources may be employed to gather marine seismic survey data. The design of these configurations can influence the cost and quality of marine seismic survey performance.

Figure 1:
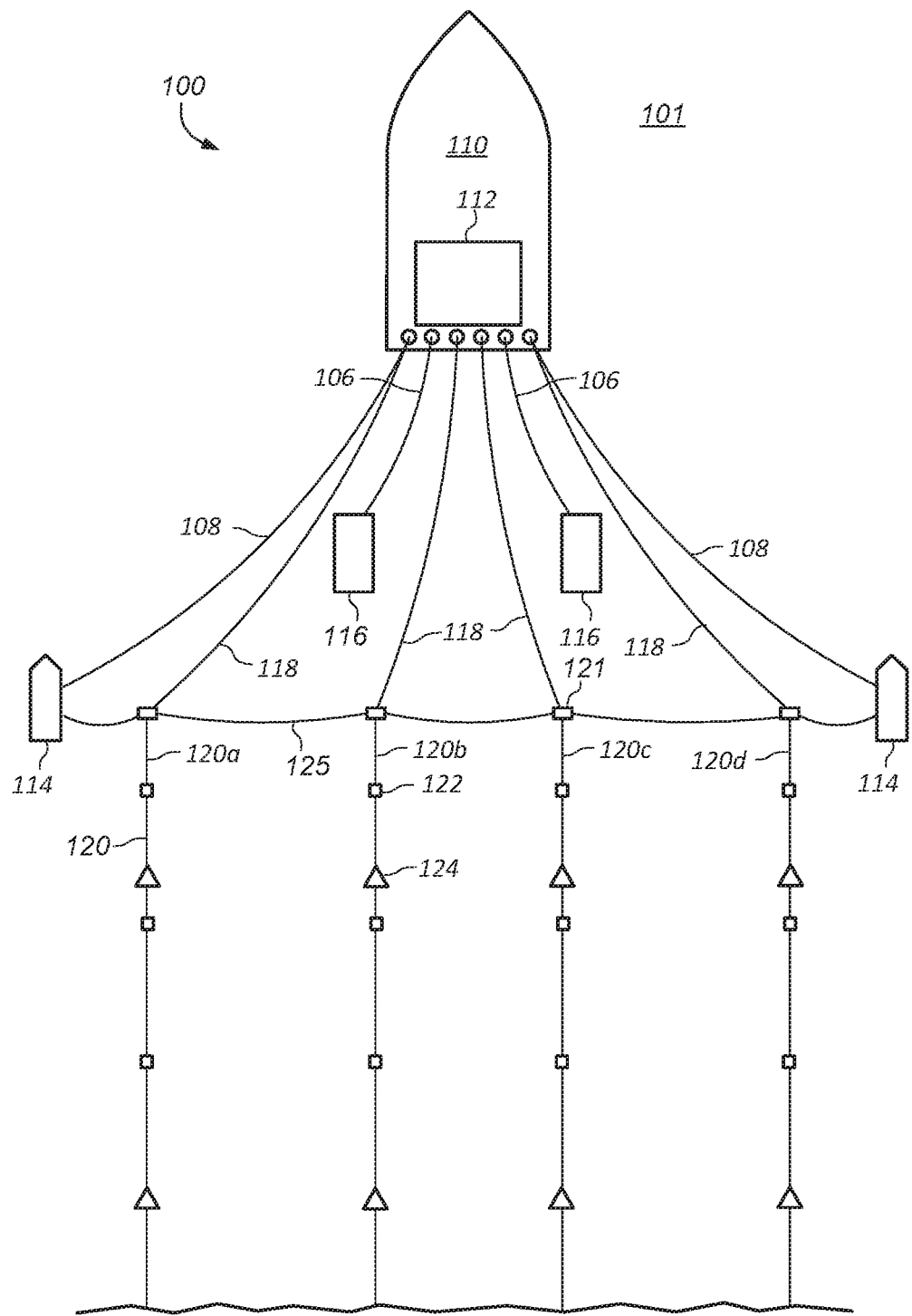
FIG. 1 is a diagram illustrating an example embodiment of a marine geophysical survey system.

While the invention is susceptible to various modifications and alternative forms, specific embodiments thereof are shown by way of example in the drawings and are herein described in detail. It should be understood, however, that the drawings and detailed description thereto are not intended to limit the disclosure to the particular form disclosed, but on the contrary, the intention is to cover all modifications, equivalents and alternatives falling within the spirit and scope of the present disclosure, including the appended claims. Particular features, structures, or characteristics may be combined in any suitable manner consistent with this disclosure.

It is to be understood that the terminology used herein is for the purpose of describing particular embodiments only, and is not intended to be limiting. As used herein, the singular forms "a," "an," and "the" include singular and plural referents unless the content clearly dictates otherwise. Furthermore, the words "can" and "may" are used throughout this application in a permissive sense (i.e., having the potential to, being able to), not in a mandatory sense (i.e., must). The terms "include" and "comprise," and derivations thereof, mean "including, but not limited to."

As used herein, the term "coupled to" may indicate one or more connections between elements, and a coupling may include intervening elements. That is, two elements may be indirectly coupled by virtue of intervening elements. By contrast, in the absence of intervening elements, two elements may be said to be "directly coupled" to one another.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "mobile device configured to generate a hash value" is intended to cover, for example, a mobile device that performs this function during operation, even if the device in question is not currently being used (e.g., when its battery is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed mobile computing device, for example, would not be considered to be "configured to" perform some specific function, although it may be "configurable to" perform that function. After appropriate programming, the mobile computing device may then be configured to perform that function.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the term "based on" describes one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

DETAILED DESCRIPTION

Introduction

In the oil and gas exploration industry, marine geophysical surveying is commonly used in the search for subterranean formations. Marine geophysical surveying techniques yield knowledge of the subsurface structure of the Earth, which is useful for finding and extracting hydrocarbon deposits such as oil and natural gas. Seismic surveying and electromagnetic surveying are two of the well-known techniques of marine geophysical surveying.

For example, in a seismic survey conducted in a marine environment (which may include saltwater, freshwater, and/ or brackish water environments), one or more seismic signal sources are typically configured to be submerged and towed by a vessel, such as a survey vessel or a source vessel. The survey vessel is typically also configured to tow one or more (typically a plurality of) laterally-spaced streamers through the water. In a typical seismic survey, a vessel may tow a seismic signal source (e.g., an air gun or a marine vibrator) and a plurality of streamers along which a number of seismic sensors (e.g., hydrophones and/or geophones) are located. In some instances, seismic sensors may be secured at or near the bottom of the body of water. Acoustic waves generated by the seismic signal source may be transmitted to the Earth's crust and then, after interacting with the subsurface formation, captured at the seismic sensors.

Likewise, electromagnetic surveys may tow equipment, including electromagnetic signal sources and streamers, in a similar fashion. For example, an electromagnetic transmitter (also referred to as an electromagnetic signal source or as an antenna) may be used to generate electromagnetic signals that are propagated into the subterranean structure, interact with subterranean elements, and then be received by electromagnetic receivers (also referred to as electromagnetic sensors) on the streamers (and/or at or near the bottom of the body of water). Data collected during a marine geophysical survey may be analyzed to locate hydrocarbon-bearing geological structures, and thus determine where deposits of oil and natural gas may be located. Some techniques of marine geophysical surveying involve the simultaneous use of seismic and electromagnetic survey equipment.

In a typical marine seismic survey, a seismic source such as a marine vibrator or an air gun is commonly used. For example, a plurality of air guns of different sizes may typically be included in an air gun array towable behind a survey vessel or another vessel. The air gun array is generally suspended by chains of selected length from a buoy, float or similar flotation device. In a typical air gun array, an individual air gun includes two electrical leads connected to a solenoid valve for firing the air gun. In addition, the air gun typically includes a high pressure air feedline.

The receivers (or sensors) used in marine surveying may be located within streamers that may be towed behind a moving vessel. According to some embodiments, the vessel may include one or more energy generating sources (e.g., an airgun, a marine vibrator, etc.) and one or more streamers including the sensors. Each streamer may contain one or more sensors that detect (e.g., measure) reflections of energy generated by the source(s), as described above. The sensors of a streamer may extend along a length of the streamer so as to provide a number of sensors collecting data at locations along a first spatial dimension (e.g., along the length of the streamer). Note that streamers may comprise a plurality of interconnected sections, wherein each section includes one or more sensors. The streamer sections may be modular, allowing a single section of a streamer comprising multiple interconnected sections to be replaced. Each streamer section may range from approximately 50 to 100 meters in length, although other lengths are contemplated. Streamers may vary in length, for example according to the requirements of the survey. Streamers may range from 3 to 12 kilometers in length, although streamers of different lengths (both shorter and longer) do not depart from the scope of the present disclosure. Note that a vessel may tow a plurality of streamers that extend in various geometric arrangements behind the vessel so as to provide an increase in collected data as compared to a survey that includes a single streamer.

Various challenges may arise in collecting marine surveying data using a survey vessel. Embodiments of this disclosure may be used to address some of these challenges, as discussed below.

Example Survey Vessel

FIG. 1 is a diagram illustrating an example embodiment of a marine geophysical survey system. System 100 includes survey vessel 110 that may be configured to move along a surface of body of water 101 (e.g., an ocean or a lake) according to various sail paths. In the illustrated embodiment, survey vessel 110 tows signal sources 116 and streamers 120. As used herein, the term "signal source" or "source element" refers to an apparatus that is configured to emit a signal (e.g., acoustic, electromagnetic, etc.) that may be reflected from one or more underlying structures and then measured. As used herein, the term "streamer" refers to an apparatus that may be towed behind a vessel to detect such signals, and thus may include detectors, sensors, receivers, and/or other structures configured to measure the reflected signal (e.g., by using hydrophones, geophones, electrodes, etc. positioned along or within the streamer).

Signal sources 116 are shown in FIG. 1 being towed by survey vessel 110 using source cables 106. Each of signal sources 116 may include sub-arrays of multiple individual signal sources. For example, signal source 116 may include a plurality of air guns, marine vibrators, and/or electromagnetic signal sources.

Streamers 120 are shown truncated at the bottom of FIG. 1. Streamers 120 may include sensors 122. Sensors 122 may include pressure sensors such as, e.g., hydrophones; particle motion sensors such as, e.g., geophones and/or accelerometers, which may respectively measure velocity and acceleration; or electromagnetic sensors, as well as any suitable combination of these or other types of sensors. Streamers 120 may further include streamer steering devices 124 (also referred to as "birds") which may provide controlled lateral and/or vertical forces to streamers 120 as they are towed through the water, typically based on wings or hydrofoils that provide hydrodynamic lift. Streamers 120 may further include tail buoys (not shown) at their respective back ends. As illustrated in FIG. 1, streamers 120 are coupled to survey vessel 110 via lead-in cables 118 and lead-in cable terminations 121. Lead-in cable terminations 121 may be coupled to or associated with spreader ropes or cables 125 so as to fix the lateral positions of streamers 120 with respect to each other and with respect to a centerline of survey vessel 110. Streamers 120a-120d may be fixed in lateral positions with respect to each other in order to form a survey spread to collect geophysical survey data as survey vessel 110 traverses various sail paths on the surface of body of water 101. As shown, system 100 may also include two paravanes 114 coupled to survey vessel 110 via paravane tow ropes 108. Paravanes 114 are the outermost components in the streamer spread and may be used to provide streamer separation.

In various embodiments, a geophysical survey system may include any appropriate number of towed signal sources 116 and streamers 120. For example, FIG. 1 shows two signal sources 116 and four streamers 120. In other embodiments, however, survey vessel 110 may tow a single streamer or many more streamers. In one embodiment, for example, survey vessel 110 may tow eighteen or more streamers. A geophysical survey system with an increased number of signal sources 116 and streamers 120, in some embodiments, may allow for more survey data to be collected and/or a wider survey spread to be achieved.

Geodetic position (or "position") of the various elements of system 100 may be determined using various devices, including navigation equipment such as relative acoustic ranging units and/or global navigation satellite systems (e.g., a global positioning system (GPS)).

Survey vessel 110 may include equipment, shown generally at 112 and for convenience collectively referred to as a "recording system." Recording system 112 may include devices such as a data recording unit (not shown separately) for making a record (e.g., with respect to time) of signals collected by various geophysical sensors. For example, in various embodiments, recording system 112 may be configured to record reflected signals received at sensors 122 while survey vessel 110 traverses various sail paths on the surface of body of water 101. Recording system 112 may also include navigation equipment (not shown separately), which may be configured to control, determine, and record, at selected times, the geodetic positions of: survey vessel 110, signal sources 116, streamers 120, sensors 122, etc. Recording system 112 may also include a communication system for communicating with other vessels, on-shore facilities, etc.

Example Multicomponent Streamer

Figure 2:
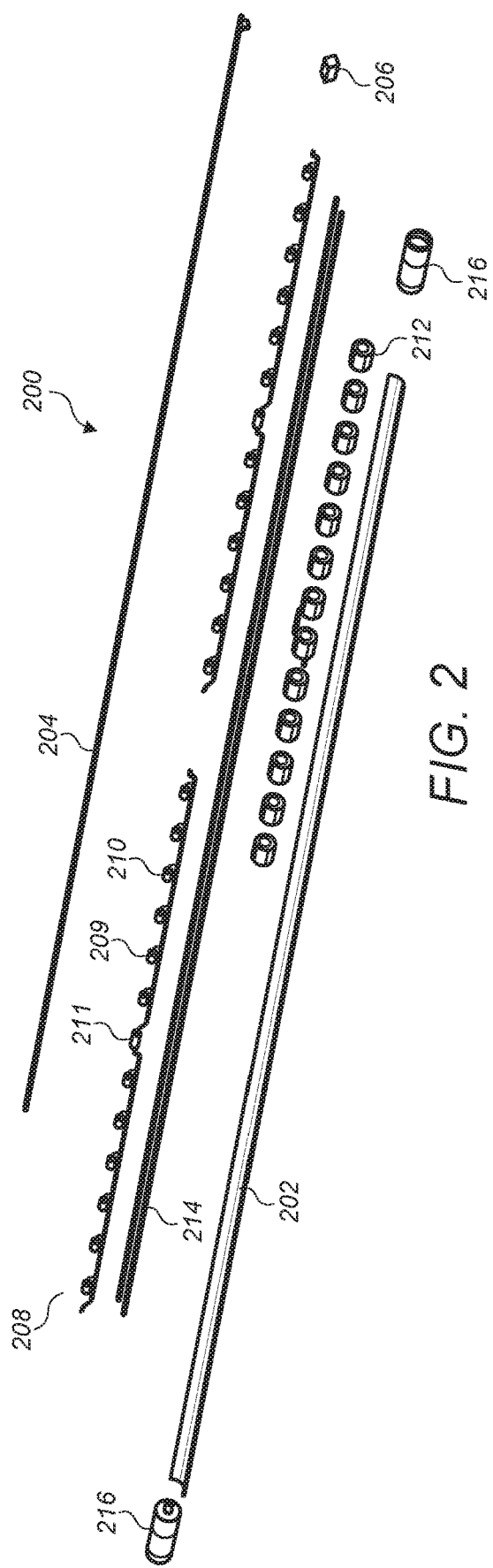
FIG. 2 is a diagram illustrating an exploded view of an example embodiment of components of a multicomponent streamer for use in a marine geophysical survey.

FIG. 2 is a diagram illustrating an exploded view of an example embodiment of components of a multicomponent streamer for use in a marine geophysical survey. Note that the terms "multicomponent streamer," "seismic streamer," and "streamer" are used interchangeably throughout the disclosure. Streamer 200 may be configured to detected the reflected energy that travels from a signal source (such as signal source 116), through the water layer, through the earth, and back up to the surface. Streamer 200 may be one of one or more streamers towed behind a vessel (such as vessel 110) performing marine geophysical surveying. Streamer 200 may include outer sheath 202 (which may also be referred to as a "jacket"), which separates an interior region of the streamer from the exterior of the streamer. By way of non-limiting example, outer sheath 202 may be made of a polymer (e.g., a natural or synthetic polymer), including, for example, polyurethane or polyvinyl chloride. Outer sheath 202 may be made of any suitable material that allows streamer 200 to flex and to resist fluid ingress and egress (e.g., impermeable to within an acceptable tolerance). Outer sheath 202 may be acoustically transparent such that a seismic signal may pass through streamer 200 with no or minimal distortion. Streamer 200 may contain a fluid or a gel. For example, streamer 200 may contain a fluid such as oil (e.g., an organic oil such as kerosene, a synthetic oil, among others). Alternatively, streamer 200 may contain gel. Generally speaking, any suitable type of gel presenting the desired acoustic and buoyancy properties may be employed. For example, silicone gels (such as those resulting from mixture of binary components) may be employed, either alone or in combination with oils such as a paraffinic oil. Note that the use of gel instead of a fluid may offer various advantages, including one or more of making component replacement easier, making manufacturing of the streamer easier, avoiding the leakage of fluid, and/or reducing the level of energy (e.g., noise) propagating inside the streamer.

Streamer 200 may include various components within the interior region to aid in marine geophysical surveying. Streamer 200 may include cabling 204 that may be configured to supply power to sensor network 208 and to provide communications between sensor network 208 and a vessel (e.g., with a recording system on a vessel, such as recording system 112 on vessel 110). Cabling 204 may include electrical cabling, optical fiber cabling, a bundle of electrical and fiber cabling, as well as any suitable combination of these or other types of cabling. Cabling 204 may be configured to pass through one or more spacers, such as spacers 212. Cabling 204 may be coupled to node 206 and to end connector 216. Node 206 may be configured to receive data from sensor network 208 and transmit data to the vessel via cabling 204.

According to some embodiments, node 206 may digitize the data received from sensor network 208 before transmission of the data to the vessel. In other words, node 206 may convert an analog signal (e.g., a signal from sensor network 208) to a digital signal. (Note that some signals received from sensor network 208 may already be digital data, and so may not require conversion. For example, some sensors based on micro-electro-mechanical systems (MEMS) technology may provide sensor output in a digital format.) Node 206 may be placed inside streamer 200 or may be placed in a canister (e.g., a metal canister) between streamer sections. A node may receive signals from one or more sensors (e.g., one or more sensors in sensor network 208) and may generate a digital signal, which may then be transmitted to the vessel. Note that streamer 200 may include a single node 206 or a plurality of nodes 206.

Figure 3:
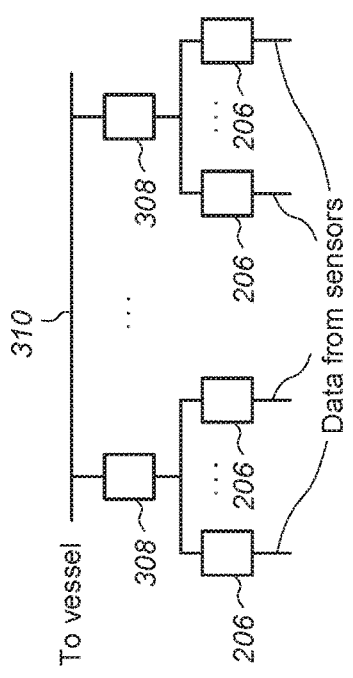
FIG. 3 is a diagram illustrating an example embodiment of a hierarchical sensor network.

In some embodiments, nodes 206 may be deployed as part of a hierarchical network, one example of which is illustrated in FIG. 3. As shown in FIG. 3, multiple nodes 206 may receive data from various sensors (e.g., hydrophones 209, motion sensors, tilt sensors 211, and/or other sensors, as described below with respect to sensor network 208). Signals received from the various nodes 206 within sensor network 208 may be transmitted to a concentrator unit 308, which may be placed inside streamer 200 or in a canister between streamer sections. Concentrator unit 308 may merge the received signals from multiple nodes 206 and/or other sensor networks and transmit the signals to the vessel via a backbone telemetry communication route 310. That is, digitized signals from nodes 206 may be hierarchically combined at various points, ultimately merging into telemetry backbone 310. Backbone 310 may employ multiple physically distinct channels (e.g., multiple distinct electrical or optical conductors), may be implemented as a single physical channel onto which logical channels are multiplexed, or any other suitable organization. It is noted that individual nodes 206 may receive data from one or multiple sensors, that any suitable grouping of nodes per concentrator unit 308 may be employed, and that any suitable number of concentrator units 308 may likewise be employed.

In some embodiments, sensor grouping may be performed, in which data from multiple sensors is aggregated to generate one signal, as if from one sensor. The aggregation may be performed in the analog domain prior to digitization, or in the digital domain. In some instances, the aggregation may be reversible (e.g., it may be possible to disaggregate the data into separate signals from the original sensors), while in other instances it may not. In various embodiments, sensor grouping may be performed by multiple levels of the hierarchy of FIG. 3 (e.g., by nodes 206 as well as concentrator units 308), while in other embodiments, sensor grouping may be reserved to particular levels of the network hierarchy (e.g., nodes 206 alone).

Streamer 200 may include sensor network 208 that may include a number of sensors that measure one or more metrics of interest to a marine geophysical surveying operation. Sensor network 208 may include one or more of hydrophones 209, motion sensors 210, tilt sensors 211, and others. Note that sensors within sensor network 208 may proceed along the length of streamer 200 in any order. For example, a hydrophone 209 may alternate with a motion sensor 210 (e.g., in a repeating pattern or in an irregular pattern) along the length of streamer 200. Alternatively, hydrophones 209 and motion sensors 210 may be grouped such that a plurality of hydrophones 209 may alternate with a plurality of motion sensors 210 (e.g., in a repeating pattern or in an irregular pattern) along the length of streamer 200. According to some embodiments, sensor network 208 may include one or more tilt sensors 211 (as discussed in greater detail below). If sensor network 208 includes one or more tilt sensors 211, each tilt sensor 211 may be regularly or irregularly interspersed among hydrophones 209 and motion sensors 210. Sensor network 208 may be coupled to cabling 204 and node 206. As noted above, sensor network 208 may receive power supply and communication support from cabling 204. Sensor network 208 may include hydrophones 209 that are configured to measure the energy reflected by a subsurface formation, as described above. A hydrophone (or pressure sensor) may be any sensor capable of detecting changes in pressure. According to some embodiments, the hydrophone and/or electronics coupled to the hydrophone may convert the detected pressure change to an electrical signal, which may then be transmitted to a computer on the vessel (e.g., recording system 112) for storage and/or analysis.

Streamer 200 may include one or more motion sensors 210 that measure motion in one or more dimensions. Motion sensors 210 may be any sensor that measures motion and/or acceleration, such as a geophone or an accelerometer (e.g., a microelectromechanical systems (MEMS) accelerometer, a piezoelectric accelerometer, among others). Motion sensor 210 may be placed within sensor network 208 such that motion sensor 210 can acquire a signal from all sides (e.g., such that the sensing fields of motion sensor 210 are perpendicular to each other). For example, a motion sensor 210 that measures motion in two dimensions may include two 1-axis motion sensors that are placed next to each other (e.g., placed perpendicularly to each other). Three-dimensional implementations of motion sensor 210 may also be employed in some embodiments. Employing two (or more) axes of measurement may facilitate measurement of the horizontal cross-line part of the seismic signal as opposed to just the vertical part, which in turn may facilitate subsequent seismic analysis (e.g., by presenting a richer data set for analysis).

Note that using non-gimballed motion sensors may avoid some of the drawbacks of gimballed motion sensors. For example, gimballed motion sensors may have a higher cost, a larger size, and/or a larger mass as compared to non-gimballed motion sensors. Their size and mass may often dictate the overall streamer diameter, which may affect the operational characteristics of the streamer. As an alternative to using two 1-axis motion sensors, a motion sensor 210 that measures motion in two dimensions may include a single 2-axis motion sensor. Similarly, embodiments of motion sensor 210 that measure motion in three dimensions may include, e.g., a single 3-axis sensor, three 1-axis sensors, or a combination of 1- and 2-axis sensors. According to some embodiments, measurements from motion sensor(s) may be analyzed with measurements from hydrophone(s), for example to achieve a higher signal to noise ratio.

Some types of motion sensors 210 may not be able to measure an orientation of the motion sensor relative to the gravitational field. If motion sensors 210 cannot determine an orientation of the motion sensor relative to the gravitational field, sensor network 208 may include one or more tilt sensors 211. Tilt sensors 211 may be any sensor that measures an orientation of the tilt sensor relative to the gravitational field. Tilt sensor 211 may be, for example, a two-axis or a three-axis MEMS accelerometer. Tilt sensors 211 may be placed along a length of streamer 200 as described above. According to some embodiments, tilt sensors 211 may be regularly interspersed among hydrophones 209 and motion sensors 210 (e.g., tilt sensors 211 may be placed within sensor network 208 at a regular interval, such as every 6.25 meters, every 12.5 meters, or some other regular interval). Note that other intervals (e.g., 2 meters, 10 meters, 20 meters, 50 meters, etc.) do not depart from the scope of the present disclosure.

Streamer 200 may include one or more spacers 212. Spacers 212 may be configured to provide one or more functions, including housing one or more sensors of sensor network 208 and/or providing buoyancy for streamer 200. In other words, spacers 212 may include multiple configurations depending on the one or more functions intended for each spacer. For example, a first embodiment of a spacer 212 may be configured to house a hydrophone 209 (e.g., a particular type of hydrophone, such as a T-2BX hydrophone manufactured by Teledyne Marine). A second embodiment of a spacer 212 may be configured to house a motion sensor 210 (e.g., a one-axis or a two-axis piezoelectric accelerometer). A third embodiment of a spacer 212 may be configured to house a tilt sensor 211. A fourth embodiment of a spacer 212 may be configured to provide buoyancy (e.g., without housing a sensor of sensor network 208). A fifth embodiment of a spacer 212 may be configured to house one or more electronic units, such as a digitization node 206 as described above. Note that these embodiments may not be exclusive of each other. For example, a spacer 212 may both house a hydrophone 209 and provide buoyancy. Sensors within sensor network 208 and spacers 212 will be further discussed below in reference to FIGS. 3-5.

Streamer 200 may include one or more stress members 214 configured to provide mechanical strength that allows the streamer to be towed behind a vessel. Stress members 214 may be made of any material that allows the streamer to be towed without breaking, such as steel or KEVLAR. According to some embodiments, stress members 214 may be placed off-center relative to the center of streamer 200, as discussed in greater detail below.

Streamer 200 may include one or more electronic systems (e.g., including and/or coupled to backbone 204, backbone node 206, and sensor network 208) configured to provide various functions for streamer 200, such as data collection, data transmission, and power supply. Streamer 200 may include one or more circuits (e.g., a circuit on and/or mounted to a circuit board, such as a printed circuit board (PCB)) that provide the functionality listed above. For example, node 206 and/or end connector 216 may comprise one or more circuits that may be configured to collect and transmit data and to provide power to streamer 200. Streamer 200 may include a circuit that interacts with sensor network 208, for example by reading a measurement of hydrophone 209, motion sensor 210, and/or tilt sensor 211. Streamer 200 may include a circuit that transmits the collected data, for example by digitizing a received analog signal and transmitting the digital signal to the vessel. Streamer 200 may include a power system (e.g., a power system that may include cabling 204 and node 206) that transforms (e.g., reduces) power received from the vessel from a first voltage level to a second, lower voltage level. Note that each of the functions described above may be carried out by a single circuit or by multiple circuits, and that any one circuit may perform one or more of the above functions. For example, a single circuit may both interface with a sensor to collect the measurement data and may also digitize the received measurement for transmission. The electronic functions described above may be implemented within one or more interconnected sections of the streamer (e.g., via node 206 and/or via end connectors 216). Specifically, within a streamer that comprises multiple interconnected sections, a subset of the sections of the streamer (wherein the subset includes a single section, a plurality of sections, or every section) may perform the above functions using one or more circuits implemented within each section of the subset.

Figure 4:
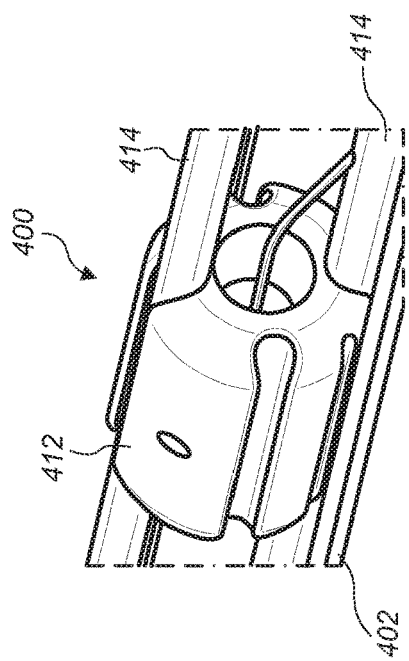
FIG. 4 is a diagram illustrating an example embodiment of a spacer of a multicomponent streamer.

FIG. 4 is a diagram illustrating an example embodiment of a spacer of a multicomponent streamer. The portion 400 of the streamer illustrated in FIG. 4 includes outer sheath 402, a sensor (not illustrated) that may be a sensor in sensor network 208 and may include hydrophone 209, motion sensor 210, and/or tilt sensor 211, spacer 412, and strength members 414. Additional components of streamer 200 are omitted from the particular view of portion 400 illustrated in FIG. 4, including a sensor of sensor network 208, cabling 204, node 206, and end connector 216. As discussed above, streamer 200 may include a plurality of sensors within sensor network 208. Note that portion 400 may house a single sensor (e.g., a single sensor of sensor network 208) within a single spacer 412 and that additional sensors and spacers 412 (not shown in FIG. 4) may proceed along the length of the streamer. In other words, each spacer 412 may house an individual sensor that may be centrally mounted within spacer 412. A view of a spacer that includes a sensor of sensor network 208 is illustrated in FIG. 4. Spacer 412 is configured such that a sensor is disposed within the center of the streamer. In other words, the sensor is center-mounted within the streamer. Further, stress members 414 are off-set from the center of the streamer. Spacer 412 includes channels on opposing sides of spacer 412 that allow stress members 414 to pass though spacer 412. Note that an advantage of mounting a sensor within the center of the streamer includes a higher signal to noise ratio as measured by the sensor. For example, centrally mounting the sensor positions the sensor as far away from the surrounding turbulent boundary layer (e.g., a boundary layer formed along outer sheath 402) as possible. In at least some circumstances, centrally mounting the sensor allows for transverse vibrations to be canceled out (e.g., fully canceled out or partially canceled out). Centrally mounting the sensor mitigates impact on the sensor from motion related to rotation of the streamer. In combination with advantages associated with using gel to fill the streamer (e.g., mitigating the transfer of torque-related noise along the length of the streamer), portion 400 of the streamer may have a high signal to noise ratio relative to prior systems in the field.

Figure 5A:
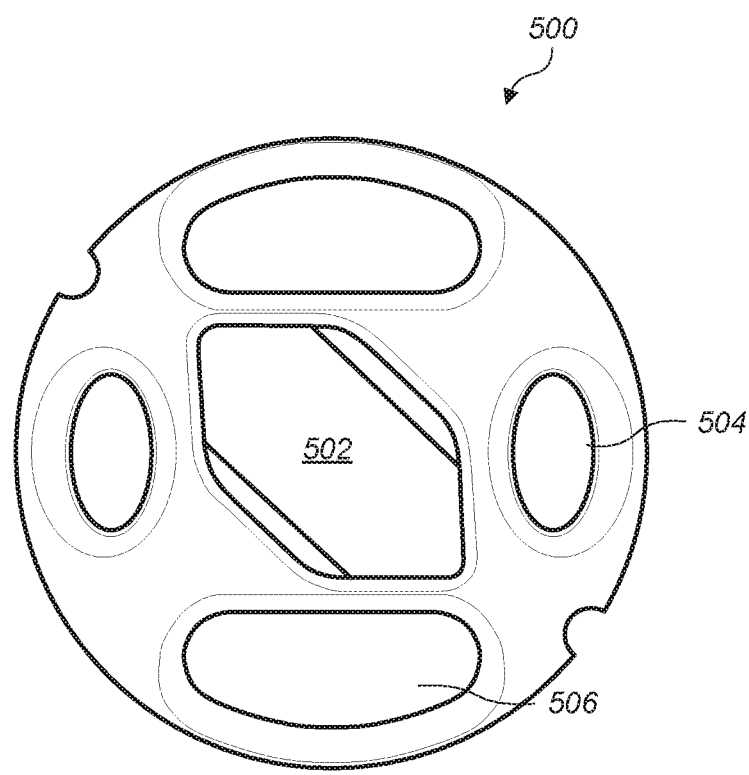
FIG. 5A is a diagram illustrating an example embodiment of a front view of a spacer with a center-mounted sensor.
Figure 5B:
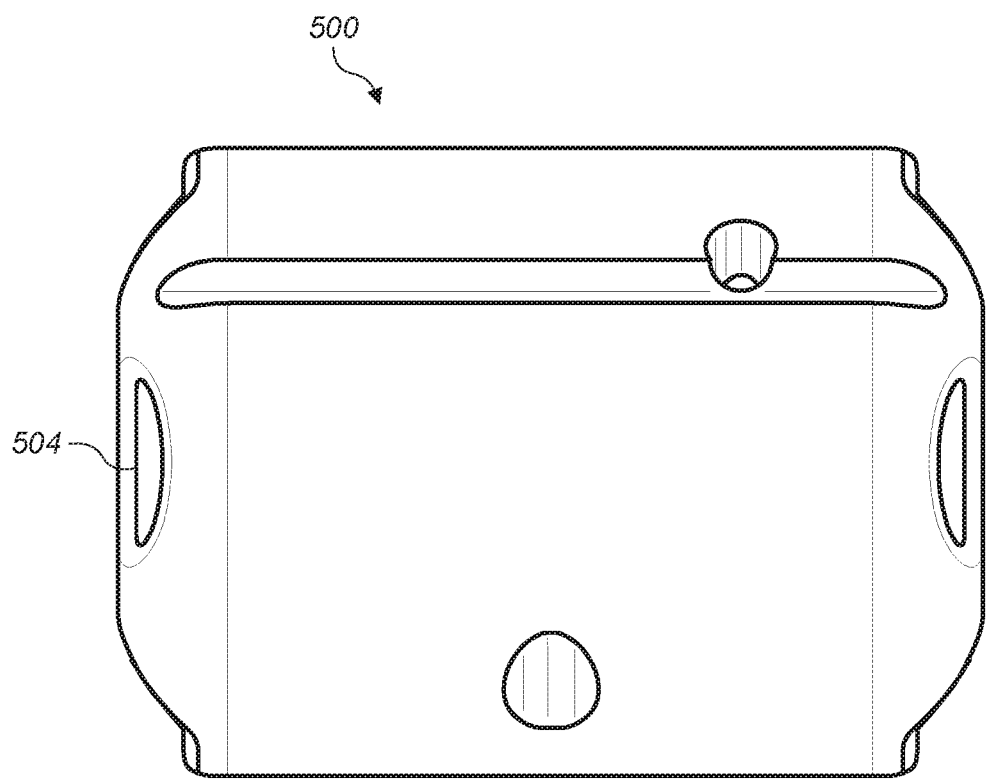
FIG. 5B is a diagram illustrating an example embodiment of a side view of a spacer with a center-mounted sensor.

FIG. 5A is a diagram illustrating an example embodiment of a front view of a spacer with a center-mounted sensor. FIG. 5B is a diagram illustrating an example embodiment of a side view of a spacer with a center-mounted sensor. Spacer 500 may include a central cutout configured to house sensor 502. The central cutout of spacer 500 may be configured to house a particular type of sensor 502 (e.g., a particular type of hydrophone, a particular type of motion sensor, a particular type of tilt sensor, among others). In other words, various configurations of spacer 500 may be particular to the specific sensor 502 intended to be housed within spacer 500. Spacer 500 may include channels 504 that are configured to allow a stress member (e.g., stress member 214) to pass though spacer 500. Note that channels 504 are off-center, thereby allowing sensor 502 to be centrally mounted within spacer 500. Spacer 500 may include buoyancy cutouts 506 that are configured to maintain the cylindrical shape of the streamer and/or to provide positive buoyancy (e.g., because of the low density of the material that makes up spacer 500).

Example Method of Manufacturing a Multicomponent Streamer

Figure 6:
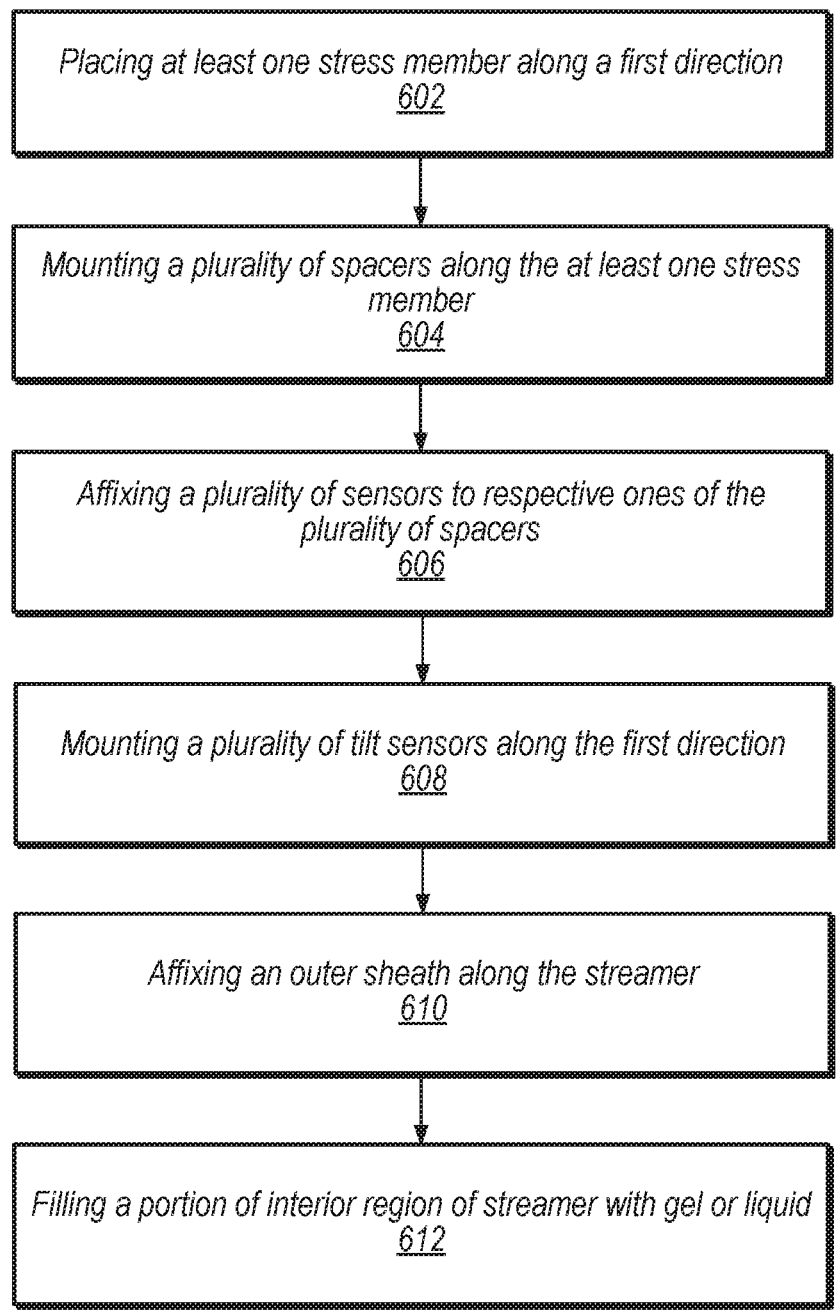
FIG. 6 is a flow diagram of an example method for manufacturing a multicomponent streamer.

FIG. 6 is a flow diagram of an example method 600 for manufacturing a multicomponent streamer. At block 602, at least one stress member is placed along a first direction. At block 604, a plurality of spacers are mounted along the at least one stress member. At block 606, a plurality of sensors are affixed to respective ones of the plurality of spacers. The plurality of sensors may be arranged longitudinally along the center of the interior region. The plurality of sensors may include a pressure sensor and a motion sensor. The pressure sensor may be a hydrophone (e.g., a piezoelectric pressure sensor). The motion sensor may be a piezoelectric accelerometer, a MEMS-based accelerometer, or a geophone. The motion sensor may be configured to acquire a signal in multiple dimensions. For example, the motion sensor may include two or three 1-axis motion sensors that are placed next to each other (e.g., placed perpendicularly to each other) and/or a single 2- or 3-axis motion sensor. Data from the plurality of sensors may be acquired as single sensor data or may be grouped (e.g., in an analog fashion) as discussed above with respect to FIG. 3. Sensor grouping may, but need not occur before digitizing the grouped analog data. At block 608, a plurality of tilt sensors are mounted along the interior region. The plurality of tilt sensors may be placed substantially regularly along the streamer. The plurality of tilt sensors may be configured to determine an orientation of respective portions of the streamer. At block 610, an outer sheath may be affixed to the streamer, wherein the outer sheath forms an interior region of a seismic streamer. At block 612, a portion of the interior region may be filled with a gel or liquid. As noted above, use of gel instead of a fluid may offer various advantages, including one or more of making component replacement easier, making manufacturing of the streamer easier, avoiding the leakage of fluid, and/or reducing the level of energy (e.g., noise) propagating inside the streamer.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:
1. A seismic streamer, comprising:
   an outer sheath that forms an interior region of the seismic streamer, wherein a portion of the interior region is filled with a gel or liquid;

at least one stress member placed off-center in the interior region;
a plurality of sensors, including:
a pressure sensor;
a two-axis motion sensor; and
a plurality of tilt sensors mounted along the interior region; and
a plurality of spacers mounted along the at least one stress member, wherein the plurality of spacers includes:
a first spacer that is configured to house the pressure sensor such that the pressure sensor is positioned proximate to a center of the interior region of the seismic streamer;
a second spacer that is configured to house the two-axis motion sensor such that the two-axis motion sensor is positioned proximate to the center of the interior region of the seismic streamer; and
a third spacer that includes one or more buoyancy cutouts configured to provide buoyancy to the seismic streamer, wherein the third spacer is not configured to house any of the plurality of sensors; and
wherein at least one of the first and second spacers includes at least one buoyancy cutout configured to provide positive buoyancy to the seismic streamer.

2. The seismic streamer of claim 1, wherein the pressure sensor is a hydrophone.

3. The seismic streamer of claim 2, wherein the hydrophone is a piezoelectric sensor.

4. The seismic streamer of claim 1, wherein the plurality of tilt sensors are mounted proximate to a center of the interior region.

5. The seismic streamer of claim 1, wherein the two-axis motion sensor is configured to detect a vertical component and a cross-line component of seismic signals received at a portion of the seismic streamer at which the two-axis motion sensor is mounted.

6. The seismic streamer of claim 1, wherein the plurality of tilt sensors are placed substantially regularly along the seismic streamer, and wherein the plurality of tilt sensors are configured to determine an orientation of respective portions of the seismic streamer.

7. The seismic streamer of claim 1, wherein data from the plurality of sensors is acquired as single sensor data.

8. The seismic streamer of claim 1, wherein data from the plurality of sensors is grouped in an analog fashion before digitization of grouped analog data.

9. A seismic streamer array, comprising:
one or more towing cables; and
a plurality of seismic streamers coupled to the one or more towing cables, wherein a particular one of the plurality of seismic streamers comprises:
an outer sheath that forms an interior region of the seismic streamer, wherein a portion of the interior region is filled with a gel or liquid;
at least one stress member placed off-center in the interior region;
a plurality of sensors, including:
a pressure sensor; and
a two-axis motion sensor; and
a plurality of spacers mounted along the at least one stress member, wherein the plurality of spacers includes:
a first spacer that is configured to house the pressure sensor such that the pressure sensor is positioned proximate to a center of the interior region of the seismic streamer;
a second spacer that is configured to house the two-axis motion sensor such that the two-axis motion sensor is positioned proximate to the center of the interior region of the seismic streamer; and
a third spacer that includes one or more buoyancy cutouts configured to provide buoyancy to the seismic streamer, wherein the third spacer is not configured to house any of the plurality of sensors; and
wherein at least one of the first and second spacers includes at least one buoyancy cutout configured to provide positive buoyancy to the particular seismic streamer.

10. The seismic streamer array of claim 9, wherein the plurality of sensors further includes a set of tilt sensors mounted along the interior region of the particular seismic streamer.

11. The seismic streamer array of claim 10, wherein individual ones of the set of tilt sensors are placed substantially regularly along the particular seismic streamer.

12. The seismic streamer array of claim 9, wherein the particular one of the plurality of seismic streamers further comprises an electrical module configured to group data from the plurality of sensors in an analog fashion before digitizing the grouped analog data to obtain grouped digital data.

13. The seismic streamer array of claim 12, wherein the particular one of the plurality of seismic streamers further comprises an electrical transmission system configured to transmit the grouped digital data.

14. The seismic streamer array of claim 9, wherein both the first and second spacers include the at least one buoyancy cutouts configured to provide positive buoyancy to the particular seismic streamer.

15. The seismic streamer of claim 1, wherein both the first and second spacers include the at least one buoyancy cutouts configured to provide positive buoyancy to the seismic streamer.

16. The seismic streamer of claim 1, wherein the first spacer includes at least one channel positioned off-center relative to the center of the seismic streamer, wherein the at least one channel is configured to allow the at least one stress member to pass through the first spacer.

17. The seismic streamer of claim 1, wherein the at least one stress member is made of steel.

18. The seismic streamer of claim 1, wherein at least a portion of the interior region of the seismic streamer is filled with a silicone gel.

19. The seismic streamer array of claim 9, wherein the second spacer includes at least one channel positioned off-center relative to the center of the particular seismic streamer, wherein the at least one channel is configured to allow the at least one stress member to pass through the second spacer.

20. The seismic streamer array of claim 9, wherein at least a portion of the interior region of the particular seismic streamer is filled with a silicone gel.

* * * * *